UNITED STATES PATENT OFFICE.

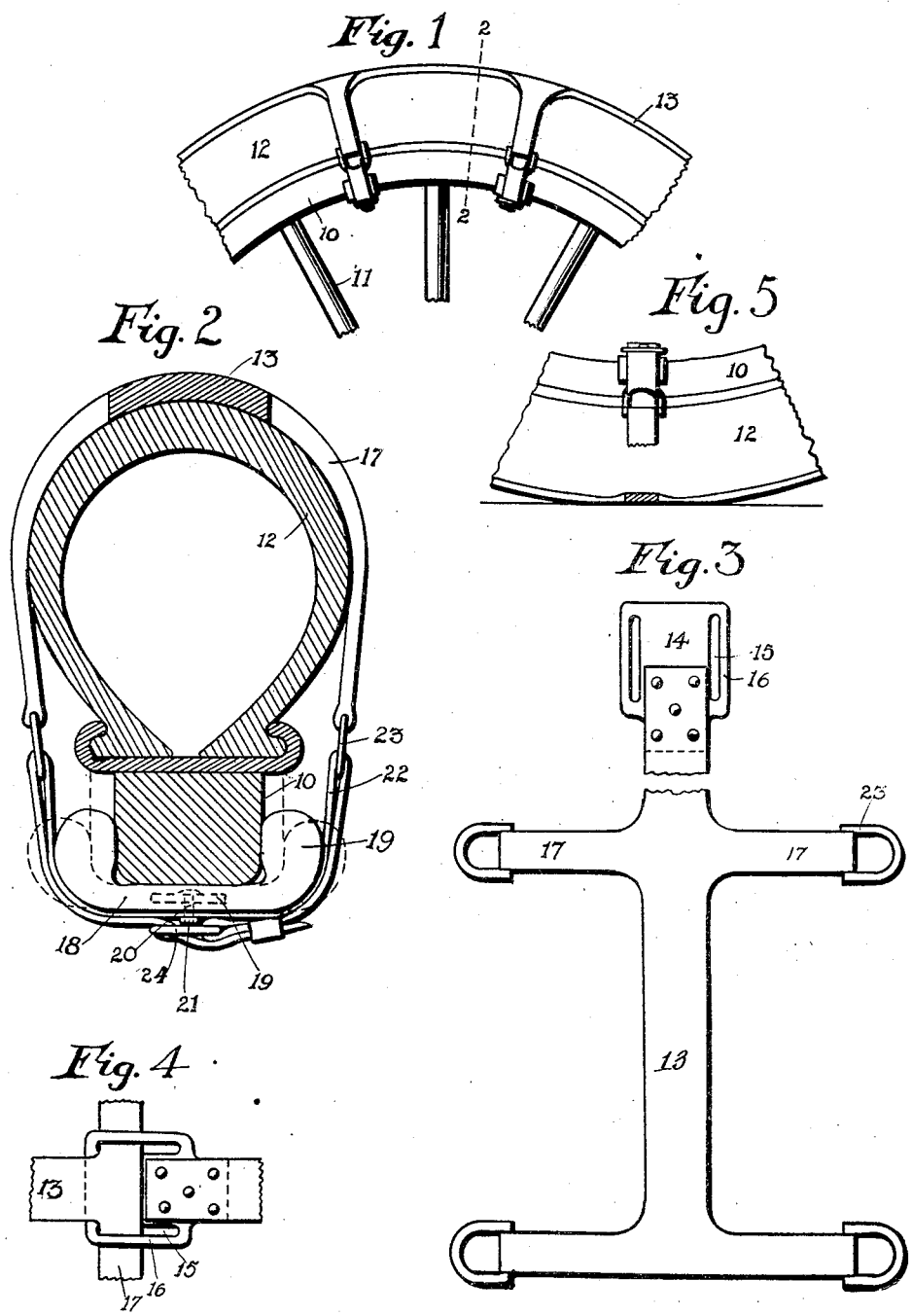

WALTER E. WILSON AND SYLVANUS S. WILSON, OF DES MOINES, IOWA.

TIRE-PROTECTOR.

1,177,669.  Specification of Letters Patent.  Patented Apr. 4, 1916.

Application filed September 2, 1915. Serial No. 48,721.

*To all whom it may concern:*

Be it known that we, WALTER E. WILSON and SYLVANUS S. WILSON, citizens of the United States, and residents of Des Moines, in the county of Polk and State of Iowa, have invented a certain new and useful Tire-Protector, of which the following is a specification.

The object of our invention is to provide a tire protector of simple, durable and inexpensive construction.

A further object is to provide a tire protector of comparatively narrow width, adapted to be mounted on the central tread portion of a tire, composed of flexible and also resilient material so that the protector may be stretched to fit tires of different sizes, and will grip the same tire firmly regardless of the state of inflation of the tire.

Still a further object is to provide such a tire protector having means for securing the same to the rim of a wheel, which means includes a series of resilient yokes made of rubber or the like adapted to be automatically fitted to fellies of different sizes and shapes.

Still a further object is to provide such a device having flexible straps or the like for securing the yokes to the circumferential tread member in such a way that one fastening device will be sufficient for each yoke, and will impose equal strain on both sides of the tread member.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a side elevation of a part of a wheel and tire equipped with a tire protector embodying our invention. Fig. 2 shows a transverse, sectional view through the rim of the tire and the tire protector, taken on the line 2—2 of Fig. 1. Fig. 3 shows a plan view of one form of our improved tire protector laid out flat the parts being broken away. Fig. 4 shows a detail, plan view of the means for connecting the ends of our improved tire protector when the same is not made in the endless form, and Fig. 5 shows a side elevation of the lower portion of a wheel and tire, the laterally extending member of the tire protector being shown in section.

In the accompanying drawings we have used the reference numeral 10 to indicate generally the felly of a wheel having the spokes 11. Mounted on the wheel is an ordinary pneumatic tire 12.

Our improved tire protector comprises a flexible resilient tread member 13, made of fabric and rubber or other suitable material, of comparatively narrow width, and adapted to be arranged circumferentially of the central tread portion of the tire 12. The tread member 13 may be made in endless form, or may be made with ends, one of which is provided with a flat member 14 of greater width than the tread member 13, and provided near its side edges with parallel slots 15. The portion of the plate 14 outside the slots 15 at 16 we have slightly raised with relation to the body of the plate 14.

The tread member 13 is provided with a plurality of pairs of opposite, lateral extensions 17, as clearly illustrated in Figs. 1, 2 and 3, which are preferably formed integral with the tread member 13. The member 17 at the end of the tread member 13 opposite that to which the plate 14 is secured, is extended through the slots 15, as shown in Fig. 4. We preferably, however, make the member 13 endless.

For securing the tread member 13 in position on the tire 12, and for properly centering it and also for making our improved tire protector adjustable for different sizes of tires and fellies, we have provided a plurality of what for convenience sake we shall term yokes 18, comprising a central, transverse member and thickened ends 19 inclined away from the body of the yoke 18 and adapted to engage between them the sides of a felly 10. The yokes 18 are preferably made of rubber or the like, so that they may be readily bent or shaped to engage fellies of different thicknesses, shapes and sizes.

Mounted in or on the yoke 18 near the surface thereof which is designed to engage the felly 10, is a washer or plate 19, shown by the dotted lines in Fig. 2. A bolt 20 is extended through the plate or washer 19, and has on its outer end a nut 21. On the bolt 20 between the nut 21 and the body of the yoke 18, is mounted a central portion of the flexible strap 22. Mounted in the ends of the extensions 17 are substantially D-shaped loop members 23. The opposite portions of the strap 22 are extended through the loop members 23 and are bent over against themselves, as shown in Fig. 2. One end of the strap 22 is provided with a buckle 24, and the other end is adjustably secured to the buckle in the ordinary way. It will be seen that by the use of the buckle and strap secured to the yoke members 18, as hereinbefore described, the strap 22 may be secured to the opposite members 17 in such a way as to tend to easily center the member 13 on the tire, and thereafter to impose equal tension on the opposite members 17 so as to hold the tread member 13 in its central position. The strap 22 is adjustable for fitting our device to tires of different diameters, and on account of the resiliency of the member 13 the same sized protector may be fitted to tires of considerable variation in size.

It will be seen that in the installation of the parts of our device, the strap members engage the outer parts of the thickened members 19 and press them inwardly against the felly 10. On account of the character of the members 18, they may be very easily adjusted to fit fellies of different sizes. In Fig. 2 we have shown by the dotted lines at the sides of the felly 10 the outline of a felly considerably thicker from side to side than that shown by the full lines, and have shown by dotted lines also how the members 19 may be easily separated to receive between them the larger sized felly.

The advantage of a protector of this kind having yoke members adapted to fit any size or shape of felly and having the simple tread member made of such material and so connected with the yoke members as to permit the protector to be stretched and fit to tires of different sizes, makes it possible to make out protectors in a few standard sizes which can be readily and easily adjusted to fit all sizes of tires. In fact, the straps 22 and yokes 18 need be carried in stock by only a limited number of the members 22 and pokes 18 need be carried in stock by the ordinary garage. By carrying a few standard sizes of the member 13, the small dealer may thus be equipped to supply the treads without being subjected to the necessity of keeping a large amount of money invested in stock.

It will be understood that changes may be made in the arrangement and construction of the parts of our improved device, without departing from its essential features, and it is our intention to cover by this application any such changes which may be included within the scope of our claims.

We claim as our invention:

1. In a tire protector, a tread member designed to be placed on the central tread portion of a pneumatic tire, and means whereby said tread member can be mounted on wheels and tires of different diameters and sizes, said means comprising a plurality of resilient yoke members, a flexible member secured to each yoke member, loop devices secured to the tread member, the opposite ends of each flexible member being extended through loop members on opposite sides of the tire and thence toward each other, means for adjustably securing said ends together, said resilient yoke members being adapted to be shaped to fellies of different sizes by the pressure of said flexible members and to protect the flexible members against contact with the felly of a wheel.

2. In a tire protector, a central tread member adapted to rest on the central tread portion of a pneumatic tire, and means for securing said central tread member on the tire and wheel, said means comprising engaging members on the tread member, a plurality of yoke members adapted to fit over the inner part of a felly, a flexible device secured to each yoke member having its opposite ends extended around the ends of said yoke member, and through said engaging members, and thence lapped over on themselves as shown, and means for adjustably securing said overlapped ends together, whereby said fastening means may be readily and easily adjusted for fitting the tread member on tires of different diameters.

3. In a tire protector, a tread member adapted to extend circumferentially around the central tread portion of a pneumatic tire, and means for securing said tread member on a wheel comprising engaging members on said tread member, a yoke device for each of said pairs of members, made of resilient material adapted to fit over the inner portion of a felly of a wheel, and a flexible device, means for securing each flexible device approximately at its center to one of said yoke members in such a manner that parts of the yoke device will be interposed at all points between the flexible device and the felly of the wheel, the ends of said flexible device being extended on opposite sides around the ends of said yoke, and through said engaging members and thence looped over themselves, and means for adjustably securing together said overlapped portions.

Des Moines, Iowa, August 11, 1915.
WALTER E. WILSON.
SYLVANUS S. WILSON.